United States Patent [19]

Boffelli

[11] Patent Number: 4,558,611
[45] Date of Patent: Dec. 17, 1985

[54] ANGULAR DIVIDER DEVICE FOR WORKTABLES, TOOLHOLDER TURRETS OR THE LIKE

[75] Inventor: Pier C. Boffelli, San Donato Milanese, Italy

[73] Assignee: Baruffaldi Frizioni S.p.A., San Donato Milanese, Italy

[21] Appl. No.: 396,868

[22] Filed: Jul. 9, 1982

[30] Foreign Application Priority Data

Jul. 22, 1981 [IT] Italy .................................. 23071 A/81

[51] Int. Cl.[4] ........................ B23B 29/32; B23Q 17/00
[52] U.S. Cl. .................................... 74/826; 74/813 C; 74/824
[58] Field of Search ................. 74/826, 822, 824, 823, 74/813 C, 817

[56] References Cited

U.S. PATENT DOCUMENTS

| | | | |
|---|---|---|---|
| 2,876,660 | 3/1959 | Malick | 74/822 X |
| 3,496,832 | 2/1970 | Celinder et al. | 74/822 X |
| 3,628,400 | 12/1971 | Chope | 74/826 |
| 3,718,055 | 2/1973 | Maier | 74/826 |
| 3,888,140 | 6/1975 | Mackelvie | 74/826 |
| 4,082,019 | 4/1978 | Shichida et al. | 74/826 X |
| 4,189,963 | 2/1980 | Sano et al. | 74/826 X |
| 4,355,548 | 10/1982 | Svensson et al. | 74/826 |

FOREIGN PATENT DOCUMENTS

| | | | |
|---|---|---|---|
| 56-147957 | 11/1981 | Japan | 74/826 |
| 835290 | 5/1960 | United Kingdom | 74/813 C |

Primary Examiner—Kenneth J. Dorner
Assistant Examiner—Rodney M. Lindsey
Attorney, Agent, or Firm—Karl F. Ross; Herbert Dubno

[57] ABSTRACT

An angular divider device is described for worktables, toolholder turrets or the like, in which the number of positions of the subdivision is not predetermined and can be of any desired value, even of very small order such as 1° or even less, without the necessity of positions constrained by mechanical arresting devices such as slots and associated latches, the exactness of the position achieved being determined by the coupling of basic fixed and movable crown gear wheels. The disengagement, the rotation and the succeeding engagement of the movable part, the worktable or toolholder turret, is achieved by the application between the movable part, the fixed part and the movement means, respectively of a brake and of a coupling or clutch which provide alternatively for blocking the movable part in rotation to the fixed part during the phases of disengagement and engagement and for connecting said movable part with the movement means during the rotation phase until the position predetermined by the programme is reached, such position being controlled by a measuring device operating by impulses or the like rotationally connected with said movable part.

10 Claims, 6 Drawing Figures

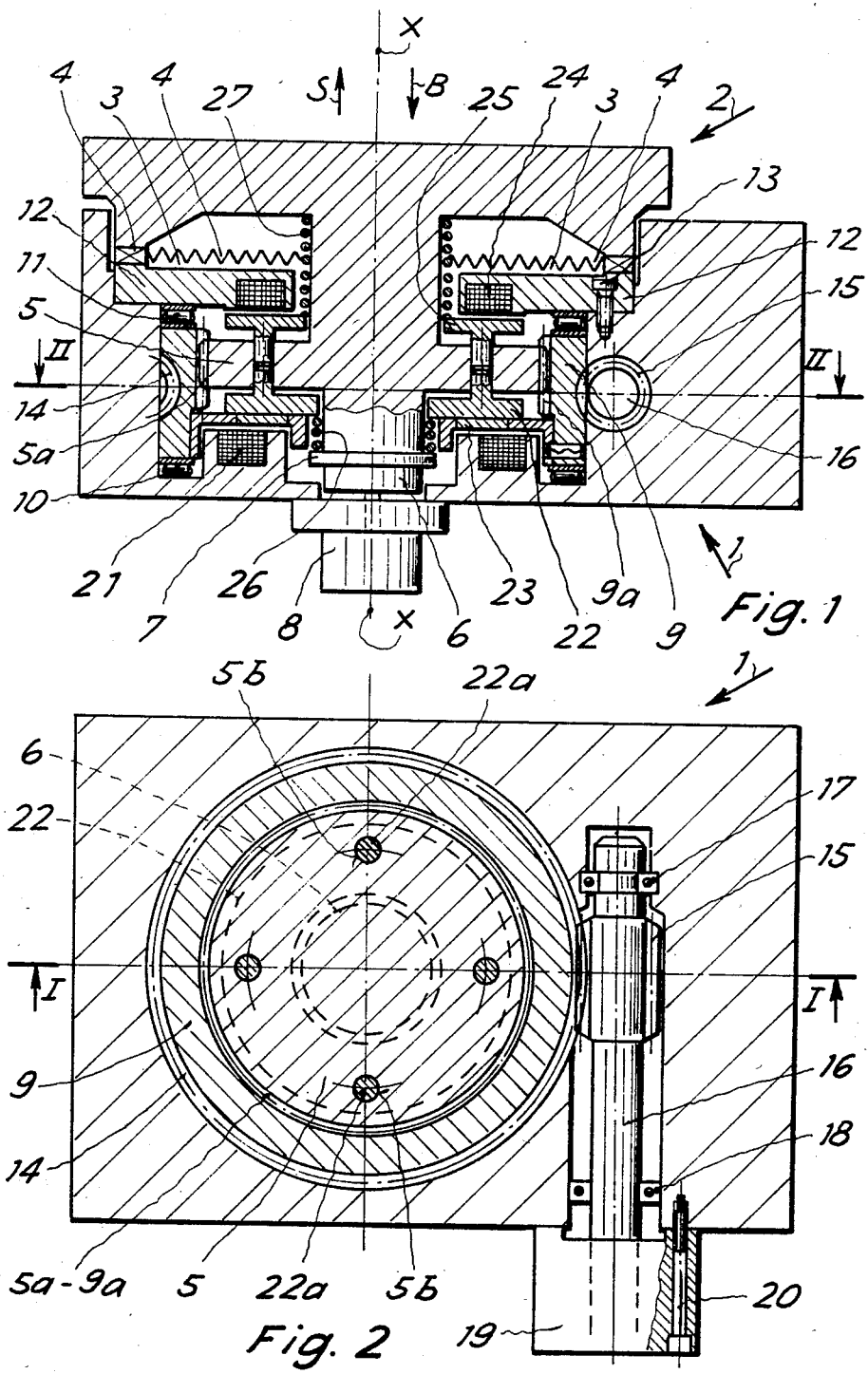

ANGULAR DIVIDER DEVICE FOR WORKTABLES, TOOLHOLDER TURRETS OR THE LIKE

FIELD OF THE INVENTION

The present invention relates to an angular divider device suitable for use with a worktable for mechanical machining operations or the like, or a toolholder body for machine tools or the like in which the positional blocking, the rotation of the movable part to a new working position, and the subsequent blocking in such position, are obtained by means of a brake and a coupling adapted respectively for arresting the movable part during the phases of blocking and unblocking and for entraining said movable part during the rotational phase for angular displacement to the new working position.

BACKGROUND OF THE INVENTION

Angular divider devices and toolholder turrets for angularly displacing a workpiece or a tool mounted thereon through a predetermined angular movement for passing from one working position to another in accordance with a predetermined program generally governed by electrical or electronic means or again by hydraulic, magnetic and similar governing devices are known. In such known devices, blocking means are generally situated in the various predetermined positions and may include fixed and mobile crown gear wheels which engage with one another, thus holding the position fixed during the working phase, and positioning means consisting generally of slots distributed along the rotational path and latches, bolts, pins or the like which are raised and introduced into said slots at each change of position of the workpiece carried by the apparatus.

While blocking in an exact position achieved by said crown gear wheels engaging with one another is entirely satisfactory for normal machining operations, the movement phase and the prepositioning of the movable part of the apparatus carried out with such known means presents numerous disadvantages which restrict the use of the apparatus.

A first disadvantage arises from the necessity of being able to have only a limited number of working positions available, due to the fact that both said positioning slots and also the latches, bolts, pins or the like with the relative extraction, insertion and control means, have dimensions in the circumferential direction which are of the order of several millimeters. For this reason, it is not possible to obtain very closely spaced angular positions. In the case where it is necessary to have available a divider with numerous positions, it is necessary to increase appreciably the diameter of the path of the slots with consequent unacceptable increase in weight and cost. A second disadvantage of the known divider devices arises from the positioning means themselves which, since they must arrest the movable part in a predetermined position, must have opposing surfaces perpendicular to the direction of movement to create a positive and rigid stopping or latching up to the instant of blocking said gear wheels in position. Such rigid stopping gives rise to an impact between the movable part and the fixed part, which is proportional to the velocity, weight, inertia, etc., of the movable part. For this reason it is necessary to create decelerations, reversals of movement and the like with a reduction in the velocity of rotation and therefore an increase in production times. Moreover, such mechanical prepositioning means are complicated and sensitive and frequently subject to wear and disadvantages of various types.

Also known are other types of divider devices which do not possess prepositioning means of the slot and latch type as in the aforementioned types, but are equipped for this purpose with an appropriate motor of electrical, hydraulic or similar type, which provides for the rotation of the movable part up to the predetermined position and in addition have to be equipped with further actuating means for blocking the movable part in the working position on the fixed part by closure of the two crown gear wheels, such further means being generally constituted of a further electrical or similar motor, or of a piston-cylinder fluid unit, elastic means or other means.

Such known types possess, nevertheless, other disadvantages. For example at least two separate actuating means must be made available, one for the movement and the other for the closure, which two means, if they are both constituted of separate motors of electrical, pneumatic or the like type, lead to a notable increase in cost, bulk and weight and can also require separate supplies with further consequent increase in cost. If, instead, the closure means is constituted of a fluid-actuated piston-cylinder group (with hydraulic or pneumatic fluid) or of springs or the like, a further disadvantage is encountered deriving from the compressibility and/or elasticity intrinsic in the fluid or in the springs, which causes a reduction in stiffness of the movable part relative to the fixed part, permitting movements both on axial planes due to eccentric forces acting upon the piece being worked upon or upon the tool in work, and upon planes perpendicular to the axis due to tangential thrusts, said last-named movements being capable of acting upon the flanks of the teeth of the crown gear wheels in contact and therefore of causing axial loadings which are transmitted finally to the fluid or to the predetermined elastic means for maintaining the closure stable.

OBJECT OF THE INVENTION

It is the object of the invention to provide a divider device either for worktables or for toolholder turrets or for other similar apparatus in which there will virtually be no limits to the number of the various working positions which can be achieved and not even if they are specified at predetermined angular values, without thereby increasing the dimensions, the weights and the costs of the equipment, nor the working times to an unacceptable extent, as is found in known devices comprising latches or several motors for mechanical closure, while maintaining for the movable part, when it is blocked in the working position, the same rigidity which is achieved in the divider devices with mechanical closure and which is not found in apparatus with fluid or elastic closure means or the like.

SUMMARY OF THE INVENTION

According to the present invention there is provided an angular divider device comprising a fixed base, a first crown gear fixedly carried on said base, a movable member mounted on said base for angular displacement about a fixed axis and for axial displacement, a second crown gear carried on said movable member for engagement with said first crown gear, a rotatable element coaxial with said axis and rotatable about said axis, mounting means restraining said rotatable element against axial displacement, clutch means operable to connect said rotatable element to said movable member, motive means actuable to rotate said rotatable element, brake means operable to prevent relative rotation between said fixed base and said movable member and a screw-nut coupling between said movable member and said rotatable member operable to displace said movable member axially to engage and disengage said first and second crown gears upon actuation of said motive means when said brake means is operative and to angularly displace said movable member about said axis when said first and second crown wheels are disengaged, said clutch means is operative, said brake means is inoperative and said motive means is actuated.

Preferably, the angular divider device comprises a fixed base on which a worktable, toolholder or the like can rotate and move in axial translatory movement, said two parts being equipped each with a coaxial crown gear wheel adapted to be inserted one into the other by an axial movement of said movable part, in such a manner as to block or release the movable part in rotation, said axial movement being determined when the movable part is rotationally blocked by a screw-nut coupling one of the parts of which, for example, the screw, is integral with said movable part and the other part, for example, the nut, is integral with a coaxial rotary element which can rotate solely but not move in translatory movement, actuated by a single motor of any appropriate type, while the angular displacement movement of said movable part is effected by the same rotary element, actuated by said motor, with contemporaneous entrainment of the nut and of the screw connected to each other, said blocking and said entrainment being effected respectively by means of a brake, for example of the friction or other type, disposed between said movable part and the fixed part, and by a coupling or clutch, e.g., of friction or other type, disposed between said rotary element and said movable part, the angular prepositioning of the movable part being effected by means of an angular measuring device of any known type, associated with the movable part and adapted for arresting the angular displacement movement within the interval between one tooth and another of said basic crown gear wheels to permit the subsequent exact positioning and the blocking upon carrying out of said axial movement of said movable part achieved by said single motor and by the arresting of said movable part carried out by said brake. The brake disposed between the movable part and fixed part is closed for rotationally arresting said movable part integral with the screw, at the commencement of the position changing cycle, whereas the rotary element integral with the nut (or vice versa) is brought into rotation, thus constraining said movable part into axial translatory movement, disengaging the movable crown gear wheel from the fixed crown gear wheel integral with base, and freeing the movable part from the angular blocking.

Subsequently, it is provided that said brake shall be opened, freeing said movable part in rotation while said coupling, clutch or the like disposed between said rotary element and said movable part is engaged in such a manner as to connect said screw and nut one to the other, thus preventing any axial translatory movement of the movable part and entraining same in angular movement upon operation of said rotary element governed by said motor.

Preferably, said brake and said coupling or clutch are of electromagnetic type in which one of the parts, e.g., the electromagnet with winding and electrical connections, is integral with the fixed base, while the relevant armature is rotationally integral with the movable part, or vice versa, by the use of means which permit to said armatures also the axial closure movement.

According to one aspect of the invention, said brake and said coupling or clutch, each equipped with said armature rotationally integral with said movable part, comprise elastic means adapted for spacing the armature away from the relevant electromagnet, said elastic means being disposed between said armature and a shoulder of the movable part.

It is possible to utilize any type of motor for the movement of the movable part and the closure blocking of same, it being required that said motor shall be capable of bringing said rotary element into rotation and of being governed by the actuation and/or arresting of said angular position measuring device integral with said movable part.

In an analogous manner, said brake and said coupling or clutch may be of any known type, including also of hydraulic, mechanical or similar type, with entraining and/or engagement surfaces operating by friction, by teeth, by flux lines or the like.

As may be noted, the angular divider device may operate for any displacement, provided that is is greater than the circumferential pitch of the teeth of the basic crown gear wheels and, therefore, by means of an appropriate selection of said pitch, for example, with values of several millimeters, it is possible to carry out displacements even of a single degree and to block the table in position after said displacement has been executed. Moreover, every position of the entire circle available is achievable with a displacement of 180° or less, taking the shortest path, provided that there are no obstacles to the movable part executing rotations in both directions, as occurs with the use of mechanical prepositions alone.

Another advantage according to this invention consists in preventing any angular displacement of the movable part in the instants of passage between the opening phase and the rotational phase due to the inevitable play existing between the various parts, due to wear or accidental movements of whatever type. In fact, it is also provided that the sequence of the operations of unblocking and movement shall take place in such a manner as to keep the entire movable complex composed of the rotary element, screw and nut, armatures and disc of the worktable, connected to one another and blocked to the fixed part by holding both the brake and the coupling simultaneously closed while the motor is stopped to pass from one phase to the other.

At the termination of the axial closure movement of the movable part, caused by said rotary element while the brake is closed and when the movable gear wheel has come to the end of its travel thus blocking itself with the fixed gear wheel integral with the base, the rotary element is arrested and simultaneously the coupling is closed, which blocks the screw and the nut to each other, remaining in this condition.

Immediately afterwards, the brake is opened, placing the apparatus in the normal working position. With such an arrangement, the screw and nut being locked to each other, a direct action is prevented, according to this invention from occurring in the axial direction due to opposition between the inclined flanks of the teeth of the two gear wheels in contact with one another and caused by vibrations or tangential forces, even also accidental ones, due to machining in progress or for other reasons, which direct axial action could load the movable part in an axial direction, thus slackening the blocking.

The movable part is therefore always in contact, both when it is in the movement phase and when it is in the working position, preventing accidental movements particularly in the case of equipment with a horizontal axis.

BRIEF DESCRIPTION OF DRAWING

FIG. 1 is a sectional view of an angular divider device according to the present invention for a worktable or toolholder turret shown in the working position, the section being taken on the line I—I of FIG. 2, FIG. 2 is a section taken on the line II—II of FIG. 1.

SPECIFIC DESCRIPTION

Figure 3:
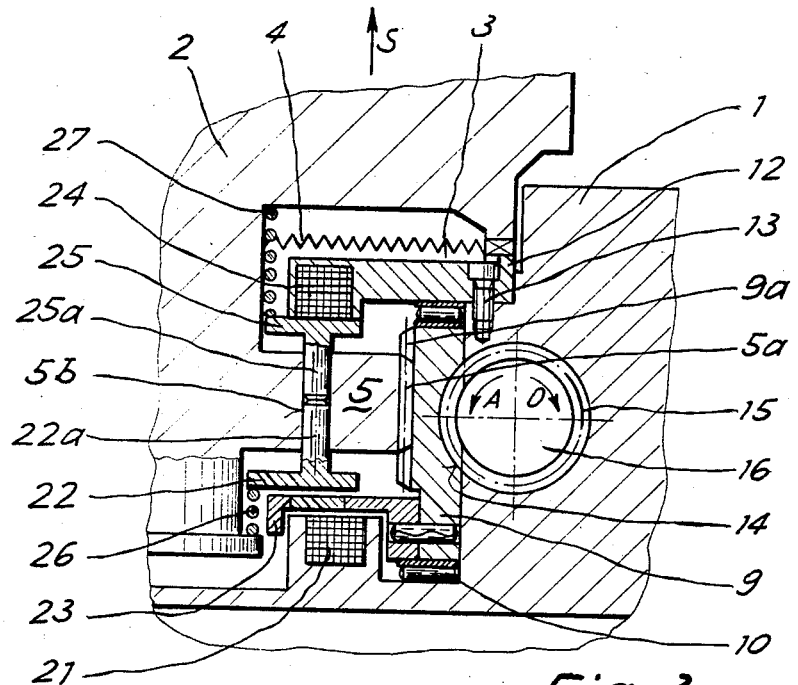
FIG. 3 shows the right-hand part of FIG. 1 to a larger scale with the device in the disengagement phase of the blocking.
Figure 4:
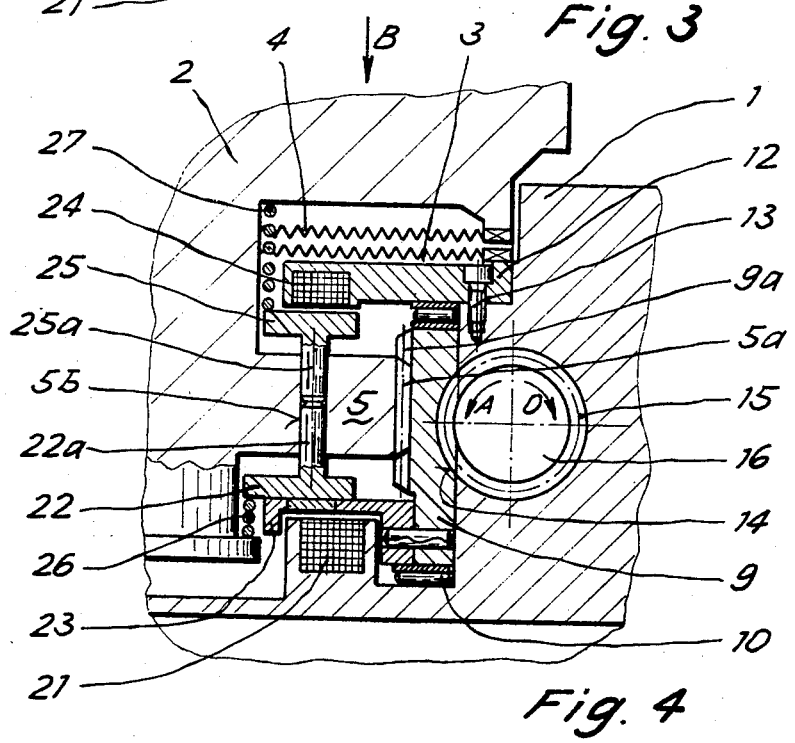
FIG. 4 shows the same part as in FIG. 3 in the disengaged position and in the rotational phase.

Referring to FIGS. 1 and 2, the angular divider device of the invention comprises a fixed base 1 in which a discshaped table or the like 2 can revolve around the axis X-X in such a manner as to be able to execute angular displacements of whatever desired predetermined value and to be blocked in a predetermined position by means of a pair of circular crown wheels, coaxial with the table itself, and of which the lower crown wheel 3 is fixed and integral with the base 1, and the other, upper crown wheel 4 is integral with the table 2 and therefore rotatable with same. The crown wheels 3 and 4 are formed with sets of teeth in known manner, the teeth having a predetermined step, e.g., for normal dimensions of 1°, so that the table 2 may be rotated and blocked through minimum angular steps of 1°.

The minimum angular displacement cannot be less than that of one step, since the final exact positioning of the table 2 is established in every case by the coupling together of the two crown wheels 3 and 4. To enable the unblocking and blocking of the two crown wheels 3 and 4, and therefore of the table 2 relative to the base 1, it is necessary for the table 2 to be axially displaceable without rotation in accordance with arrows S and B, while the rotation of the table 2 should take place without axial movement after the crown wheels 3 and 4 are unblocked and can take place either clockwise or anticlockwise.

The table 2 is integral with a disc 5 having a coaxial external thread 5a and possesses a spigot (projection) or the like 6, rotationally connected with a plate 7 forming part of a measuring device 8, constituted for example of an electromechanical apparatus adapted for converting the angular position of its revolving axis, integral with the plate 7, into a modulated electrical signal of any known type and also as a digital transducer apparatus of angular coordinates known, e.g., by the name "Encoder".

Coaxial with the disc 5 there is disposed an element 9 having on the inside an internal screw thread 9a which is of an axial length greater than that of the coupled external thread 5a and which can rotate without translatory movement about the axis X-X, supported by a lower thrust bearing 10 and an upper thrust bearing 11 which bear respectively upon the fixed base 1 and upon a ring 12 which is also fixed and is secured to the base 1 by means of screws 13 or the like.

The externally screw threaded disc 5 effectively forms a screw engaged with the thread 9a of the element 9 which acts as a nut to provide a screw-nut coupling which, when the table 2 is held against rotation and the element 9 is rotated causes the table 2 to rise or descend according to the direction of rotation of the element 9.

The lower crown wheel 3 is secured to or formed integrally with the ring 12. A helical gear 14 is formed about the periphery of the element 9 and engages an endless screw 15 formed on a shaft 16 which is supported on the base 1 by the bearings 17, 18 and is rotationally controlled by an electric motor 19 of known type fixed to the base 1 by means of the screws 20 (FIG. 2). The motor 19 is controlled in rotation and in stopping by the measuring apparatus 8 in known manner. In the embodiments illustrated in the drawings two electromagnets 21 and 24 are provided inside the base 1 and integral therewith. These two electromagnets 21 and 24 are annular and coaxial with the axis X-X of the table 2, the lower electromagnet 21 acting upon an annular friction armature 22 through a friction rotor 23 formed integrally with the element 9 to form a clutch and the upper electromagnet 24 which is integral with the fixed ring 12, acting upon an annular brake armature 25 to provide a brake for direct blocking action.

These two armatures 22 and 25 are spaced a short distance from the associated electromagnet in known manner and each possesses a plurality of pins for engaging the disc 5. The friction armature 22 possesses pins 22a oriented in a direction parallel to the axis X-X and similarly the brake armature 25 possesses pins 25a, both said pins 22a and 25a being inserted in the same bores 5b of the disc 5, although they may be disposed in another manner other than in the same bore as shown in FIG. 1.

This arrangement allows axial displacement of the table 2 with disengagement of the armatures 22 and 25 from the disc 5. Both the armatures 22, 25 are held spaced apart from the associated electromagnets by means of springs or the like, indicated as a lower spring 26 for the friction armature 22 and an upper spring 27 for the brake armature 25. Both these springs 26 and 27 bear against shoulders rotationally integral with the rotatable table 2.

The method of operation of the described device is as follows. Assume for the starting condition that the table 2 is blocked with the crown wheels 3 and 4 engaged one with the other and with the coupling 21, 22 and 23 closed (FIG. 1) i.e., in the normal position of operation with the workpiece to be machined (not shown) resting upon the table itself. Assume also that it is required to rotate the table through some angle in the case illustrated, for example, from 1° to virtually 180°, such limit being achievable by the shortest route. The motor 19 is set in rotation by commands deriving from an automatic program or by hand or by any other suitable means and the brake, composed of the electromagnet 24 and armature 25, is closed or engaged while the coupling composed of the electromagnet 21, the rotor 23 and the armature 22 is disengaged, as illustrated in FIG. 3.

The motor 19 rotated the shaft 16 with the endless screw 15 formed thereon in the direction of the arrow A (anticlockwise) and consequently the helical gear 14 and the internal thread 9a of the rotary element 9 are set in rotation, while the disc 5 with the associated external thread 5a is obliged to remain stationary by engagement of the brake 24, 25. Due to engagement of the screw-nut coupling provided by the threads 5a and 9a, the disc 5 and the entire table 2 integral therewith, together with the upper crown gear 4 are caused to be axially displaced in the direction of the arrow S, thereby disengaging the teeth of the crown gear 4 from those of the crown gear 3. Complete unblocking of the two crown gear wheels having taken place, it is possible to proceed with the angular displacement of the movable part.

The sequence of the operations of opening and rotation is provided in such a manner as to prevent any possibility of undesired movement of the various parts, even due to accidental external causes or resulting from unbalance of the load or the like, when the unblocking of the movable crown gear wheel 4 from the fixed crown wheel 3 has taken place. For this purpose, the motor 19 is stopped, the brake 24, 25 remains closed or engaged, and contemporaneously also the coupling 21, 22, 23 is closed or engaged.

In this way, the entire rotatable complex, i.e., the screw 15, the rotary element 9 with internal thread 9a, the external thread 5a, the disc 5 and the table 2 integral therewith, are blocked one with another by the coupling 21, 22, 23 and, by the brake 24, 25 and with the fixed disc 12 connected with the base 1.

In this way, any movement when the movable part is unblocked from the fixed part and the motor is not in action is prevented.

In fact, in this phase, it would be possible for movements, even though small ones, to take place due to the play between the surfaces in movement, between the supports, bearings and the like.

When the motor 19 is again set in motion to cause the angular displacement of the movable part 2 to take place, the brake 24, 25 is disengaged and the table 2 remains connected rotationally by means of the coupling or clutch 21, 22, 23 with the rotary element 9, actuated in its turn by the motor 19 through the means of the screw 15 and helical gear 14 until the new predetermined angular position is reached.

Such movement is, nevertheless, followed by the measuring device 8 (FIG. 1) which, by counting the relevant pulses associated with the movement, or by any other known system, senses when the table 2 has rotated through the desired angle and stops the motor 19 and therefore the rotation of the screw 15. The angular displacement of the table 2 from one position to the next provided for by the working program can take place in either direction so as to take the shortest path, for which reason the rotation of the endless screw 15 may, when the table 2 is free to rotate, be either in accordance with the arrow A (anticlockwise) or in accordance with the arrow O (clockwise).

When the predetermined angular position has been reached, the brake 24, 25 is engaged to secure the table 2 by means of the disc 5, bores 5b, pins 25a and armature 25, to the fixed part 12 integral with the base 1, and the coupling 21, 22, 23 is opened and the screw 15 is caused to rotate in the direction of the arrow O (clockwise). The internal thread 9a compels the table 2, which is blocked against rotation but free to be displaced in the axial direction, to move in the direction of the arrow B until the upper crown gear 4 is again engaged in the fixed crown gear 3 where it is blocked in the exact position determined by the teeth engaged one with the other. The coupling 21, 22, 23 is then closed and immediately thereafter the brake 24, 25 is opened.

During the rotation of the table 2 through the predetermined angular value, the measuring device 8 detects the travel executed, stopping the motor 19, as stated, when said value has been reached; however, any error in stopping can be contained within the value of the step of the teeth (decreased by any possible external parting of the teeth) as it is sufficient for the teeth of the movable upper crown gear wheel 4 to be positioned within the space of the set of fixed teeth of the crown wheel 3 corresponding to the required movement so that, when the two crown gears are again blocked or engaged, a small angular displacement may occur due to the fit of the relevant teeth, adapted for correcting possible error of stopping of the measuring device 8.

During the carrying out of machining, the table 2 therefore remains blocked and locked in position by the crown gear wheels 3, 4 engaged with each other but, in order to avoid any possibility of accidental movement of the external thread 5a and/or of the internal thread 9a due to random causes, said external thread and said internal thread are integrally connected one with the other by means of the coupling 21, 22, 23, as stated, which remains closed or engaged for the entire period of operation of the table, thus preventing any axial movement caused, e.g., by vibrations acting upon the flanks of the teeth of the two crown wheels in contact.

Moreover, the assembly comprising table 2, external thread 5a, internal thread 9a, which are connected to one another by the coupling 21, 22, 23 and which are locked by the crown gear wheels 3, 4 to the fixed part, cannot carry out any movement at all, even by chance, as could be caused by the motor 19 through the coupling between the endless screw 15 and the helical gear 14.

Figure 5:
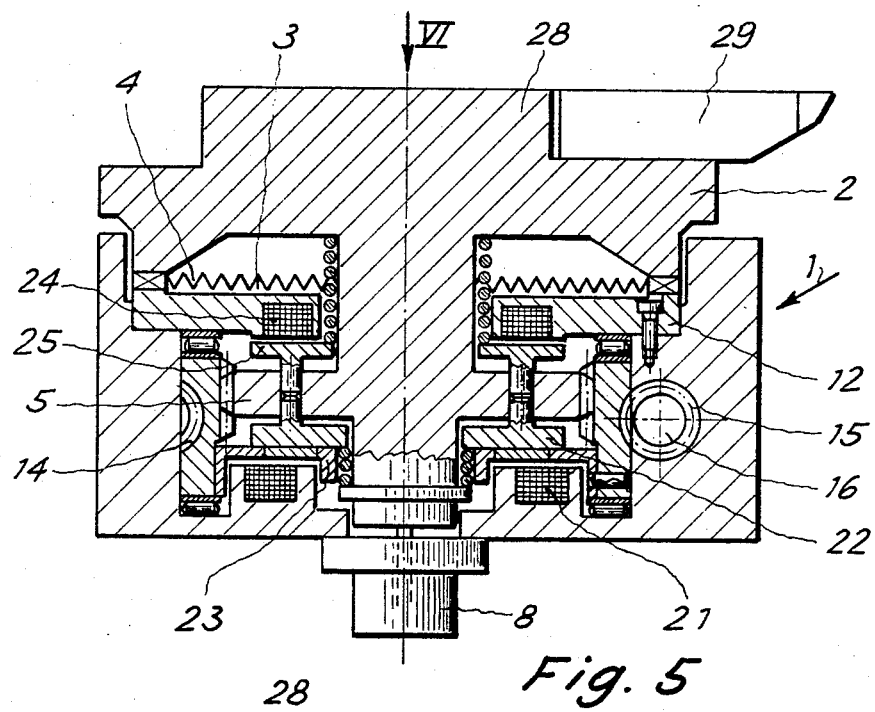
FIG. 5 is a view similar to FIG. 1, showing the device associated with a toolholder turret.
Figure 6:
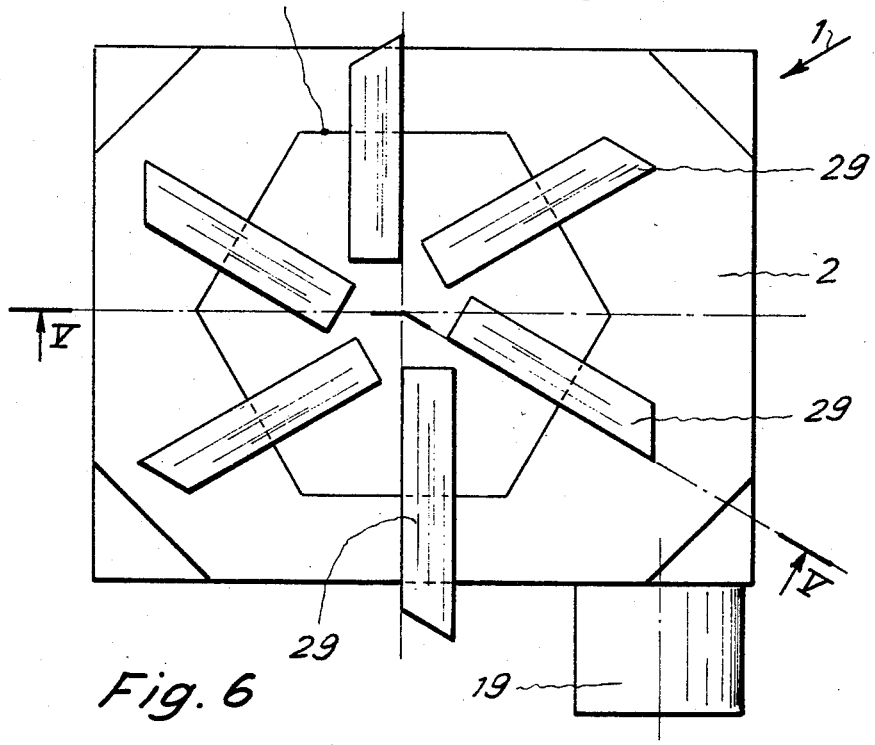
FIG. 6 is a view of the device of FIG. 5, viewed along the axial arrow VI of FIG. 5.

Referring to FIGS. 5 and 6, the device described above is applied identically to the case of a toolholder turret, in which the toolholder body is composed of a turret 28, onto which is fixed a series of tools 29 in known manner. The minimum angular rotations required of the divider device will be associated with the number of tools which can be disposed upon the turret, or upon fractions of same for particular requirements.

In the case where the divider device is applied to a toolholder turret (as indeed for the case of the worktable), the further advantage is obtained, especially for turrets with a horizontal axis, namely that of avoiding the impacts due to positioning with positive arrest, i.e., by contact between rigid surfaces, such as occurs in devices with mechanical arresting or stopping means, the arresting in position being achieved by means of the command of the measuring device to the known direct current motor, or of any other type, even with gradual arresting, it being possible, as stated to accept relatively large error limits in respect of the exact position, which position is definitively achieved by the coupling of the basic crown gear wheels one with the other.

Numerous variants can, of course, be applied to that which has been described above, particularly in regard to the motive means, which may be electrical, hydraulic, stepping or the like, and the control means of known type, generally by impulse contactors or the like, as indeed in regard to the type of coupling, clutch or brake, themselves also of known type, without thereby departing from the scope of the present invention.

I claim:

1. An angular divider device comprising a fixed base, a first crown gear fixedly carried on said base, a movable member mounted on said base for angular displacement about a fixed axis and for axial displacement, a second crown gear carried on said movable member for engagement with said first crown gear, a rotatable element coaxial with said axis and rotatable about said axis, mounting means restraining said rotatable element against axial displacement, clutch means operable to connect said rotatable element to said movable member, motive means actuable to rotate said rotatable element, brake means operable to prevent relative rotation between said fixed base and said movable member and a screw-nut coupling between said movable member and said rotatable member operable to displace said movable member axially to engage and disengage said first and second crown gears upon actuation of said motive means when said brake means is operative and to angularly displace said movable member about said axis when said first and second crown wheels are disengaged, said clutch means is operative, said brake means is inoperative and said motive means is actuated, said clutch means comprising a friction rotor carried on said rotatable element, an annular clutch electromagnet mounted on said fixed base and a friction armature engaged with said movable member and responsive to energizing of said clutch electromagnet to engage said friction rotor.

2. An angular divider device according to claim 1 including spring means disposed between said movable member and said friction armature and operable to urge said friction armature away from said friction rotor.

3. An angular divider device comprising a fixed base, a first crown gear fixedly carried on said base, a movable member mounted on said base for angular displacement about a fixed axis and for axial displacement, a second crown gear carried on said movable member for engagement with said first crown gear, a rotatable element coaxial with said axis and rotatable about said axis, mounting means restraining said rotatable element against axial displacement, clutch means operable to connect said rotatable element to said movable member, motive means actuable to rotate said rotatable element, brake means operable to prevent relative rotation between said fixed base and said movable member and a screw-nut coupling between said movable member and said rotatable member operable to displace said movable member axially to engage and disengage said first and second crown gears upon actuation of said motive means when said brake means is operative and to angularly displace said movable member about said axis when said first and second crown wheels are disengaged, said clutch means is operative, said brake means is inoperative and said motive means is actuated, said brake means comprising a braking electromagnet carried on said fixed base and a brake armature engaged with said movable member and responsive to energizing of said braking electromagnet to hold said movable member against angular displacement relative to said fixed base.

4. An angular divider according to claim 3 including resilient means disposed between said movable member and said brake armature and operable to urge said brake armature away from said braking electromagnet.

5. An angular divider device comprising a fixed base, a first crown gear wheel fixedly carried on said base, a movable member mounted on said base for angular displacement about a fixed axis and for displacement in a direction parallel to said fixed axis, a second crown gear wheel carried on said movable member for engagement with said first crown gear wheel, a disc carried on said movable member, a first screw thread formed on and about the periphery of said disc, an annular rotatable element disposed about said disc, a second screw thread formed internally of said annular rotatable element and engaged with said first screw thread, said second screw thread having a length in the direction of said axis greater than said first screw thread, mounting means mounting said rotatable element in said fixed base for rotation therein and restraining said rotatable element against displacement in the direction of said axis, a helical gear formed about the periphery of said rotatable element, a shaft mounted for rotation in said fixed base, an endless screw formed on said shaft and engaged with said helical gear, motive means for drivingly rotating said shaft, sensing means associated with said movable member to sense the angular displacement thereof and control said motive means, a friction armature carrying pins extending into bores in said disc, said pins and said bores extending parallel to said axis to allow axial displacement of said friction armature relative to said disc, an annular clutch electromagnet mounted in said fixed base and operatively associated with said friction armature, an annular friction rotor carried on and extending inwardly of said rotatable element between said friction armature and said clutch electromagnet for engagement by said friction armature upon energizing of said clutch electromagnet, spring means engaged between said movable member and said friction armature operable to urge said friction armature away from said friction rotor, a brake armature engaged with said disc by pins on said brake armature extending into bores in said disc in a direction parallel to said axis to permit axial displacement of said brake armature relative to said movable member, an annular braking electromagnet mounted in said fixed base and operatively associated with said braking armature to hold said movable member against angular displacement upon energizing of said braking armature and resilient means engaged between said movable member and said braking armature to urge said braking armature away from said braking electromagnet.

6. Angular divider device for worktables, toolholder turrets or the like, comprising a fixed part in the form of a fixed base, upon which a worktable, toolholder or the like forming a movable part which can rotate and move in axial translatory movement, said parts being equipped each with a toothed coaxial crown gear wheel adapted to be inserted the one into the other with an axial movement of said movable part, in such a manner as to block or to release the movable part in rotation, said axial movement being determined, when the movable part is rotationally blocked, by a screw-nut coupling, one of the parts of which is integral with said movable part and the other part of which is integral with a coaxial rotary element, which can rotate but not execute translatory movement, actuated by a single motor of any appropriate type, whereas the angular displacement movement of said movable part is effected by the same rotary element, actuated by said motor, with contemporaneous entraining of the screw and of the nut connected the one to the other, said blocking and said entraining being effected respectively by means of a brake disposed between said movable part and the fixed part, and a clutch disposed between said rotary element and said movable part, the angular prepositioning of the movable part being effected by means of an angular measuring device associated with the movable part and adapted for arresting the angular displacement movement within the interval between one tooth and another of said crown gear wheels, for permitting the succeeding exact positioning and blocking on the carrying out of said axial movement of said movable part, achieved by said single motor and by the arresting of the movable part effected by said brake, said brake and said clutch being of electromagnetic type, in which the electromagnet with winding and electrical connections, is integral with the fixed base, while an associated armature is rotationally integral with the movable part, through the agency of means which permit said armature to also have the axial closure movement.

7. Device according to claim 6 wherein said brake and said cluch are each equipped with an armature rotationally coupled with said movable part, and comprise elastic means adapted for maintaining the respective armature spaced away from an associated electromagnet, said elastic means being disposed between said armature and a shoulder of the movable part.

8. Device according to claim 6 wherein said brake and said clutch have entrainment and engagement surfaces operating by friction.

9. Device according to claim 6 wherein upon completion of the deblocking of the movable part from the fixed part and before the angular rotation for positioning is commenced, a movable complex, constituted of the rotary element, screw and nut, and the table, is blocked to the fixed part of the device in order to prevent any accidental movement.

10. Device according to claim 6 wherein for the axial closure movement of the movable part, the brake is closed, the coupling is open and the endless screw is set in rotation until the movable crown gear is completely engaged in the fixed crown gear, the motor being stopped at this point, the coupling closed and the brake opened, placing the apparatus in the working position without movements being able to occur, even axial movements due to vibrations, tangential forces or the like.

* * * * *